United States Patent [19]
Livas

[11] 3,762,804
[45] Oct. 2, 1973

[54] EYEGLASS FRAME HAVING SPLIT RIMS AND DETACHABLE SIDE PIECES

[75] Inventor: Konstantin Livas, Gerlingen, Germany

[73] Assignee: Nufer-Optik Neostyle Walter A. Nufer, Gerlingen, Germany

[22] Filed: Aug. 28, 1972

[21] Appl. No.: 284,459

[30] Foreign Application Priority Data
Aug. 28, 1971 Germany .................. G 71 32 959.4

[52] U.S. Cl. ..................... 351/90, 351/92, 351/116, 351/140, 351/141
[51] Int. Cl. ........................... G02c 1/08, G02c 5/14
[58] Field of Search ................... 351/90, 92, 95, 96, 351/97, 116, 140, 141

[56] References Cited
UNITED STATES PATENTS
3,473,869  10/1969  Pluznik et al. .................. 351/140 X Primary Examiner—David Schonberg
Assistant Examiner—Paul A. Sacher
Attorney—Eric H. Waters et al.

[57] ABSTRACT

A eyeglass frame having lens-encompassing rims including slot in their outer portions facilitating insertion and removal of lenses. Bores extend through the rims on both sides of the slot adapted to receive fasteners mounted on a clamp hingedly supporting side pieces for the frame, and imparting a closing force to the slot. A pivotable closing lever is mounted on one side of the slot and has a portion adapted to engage a recess in the rim on the other side of the slot so as to form a further releasable calmp for latching the slot into contracted or closed relationship.

5 Claims, 5 Drawing Figures

PATENTED OCT 2 1973     3,762,804

EYEGLASS FRAME HAVING SPLIT RIMS AND DETACHABLE SIDE PIECES

FIELD OF THE INVENTION

The present invention relates to a frame for eyeglasses having lens-encompassing rims which are provided with adjustable width slots in their outer portions, and with the slots adapted to be covered by clamps having suitable hinges for the attachment of side pieces or temples for the eyeglasses. Slots must be provided in the lens-encompassing rims of eyeglass frames when the material of which the central portion or rim, of which the frame is made, cannot be widened through moderate heating to an extent permitting the fitting or insertion of the lenses into the eyeglass rims. For example, that is the case when the frames of the eyeglasses are made of metal.

DESCRIPTION OF PRIOR ART

In conventional metallic frames for eyeglasses, the slots which are usually provided in the eyeglass or lens-encompassing rims are contracted by means of closure blocks or bosses which are soldered to the eyeglass rims. However, the required soldering operation in attaching the closure bosses to the rims cannot be carried out in eyeglass frames which are made of aluminum. Consequently, the slots in rims of the eyeglass frames formed of aluminum are generally contracted by means of screws which engage threads formed in bores provided in the eyeglass rims. However, this type threaded connection is impractical when used in aluminum eyeglass frames, since the thread is easily damaged or even destroyed when subjected to high or repetitive stresses, in view of the inherent softness of aluminum.

SUMMARY OF THE INVENTION

It is accordingly, an object of the invention to provide a frame for the eyeglass having lens-encompassing rims which are provided with slots in their outer portions, and in which the slots may be readily and securely contracted or closed irrespective of the material used, without impairing the aesthetic quality of the eyeglass frame.

The foregoing object is attained in an eyeglass frame in accordance with the invention, by providing at least one bore on both sides or each slot, and which are adapted to accommodate a connecting bolt or screw attached to a corresponding clamp. Consequently, the slot in the lens-encompassing rims of the frame, according to the invention, can be easily contracted or closed by introducing the connecting bolts or screws of the respective clamp in alignment with the bores located on both sides of a corresponding slot, whereby the portions of the rims extending from both sides of the slot are clamped or held together by the bolts and the clamp. In less expensive frames for eyeglasses, such as for instance, for non-prescription sunglasses, in which there is no exchange or replacement of the lenses, the bolts may take the form of rivets, which may be rigidly and permanently riveted into the eyeglass rims after their positioning within the bores provided in the rims. The bolts may also be formed as threaded pins or internally threaded sleeves for use in eyeglass frames whose eyeglasses or lenses are interchangeable. The rigid connection of the clamps with the eyeglass rims in this case may be effected by means of suitable nuts screwed onto the free ends of the threaded pins protruding from the bores, or through screws or bolts screwed into the open ends of the internally threaded sleeves.

The fitting of the lenses into an eyeglass frame is extremely complicated, particularly in frames made of metal, such as for instance, aluminum, since the eyeglass or lens and the encompassing rim must be fitted together with an accuracy of up to a tenth of a millimeter. Thus, it is frequently unavoidable that the lens be inserted into and removed from the eyeglass rim several times in order to ascertain that the eyeglass is properly ground. In order to facilitate and simplify this fitting sequence, it is advantageous that the slot may be readily contracted or closed and latched during the fitting of the lens. This is made possible in the inventive frame by simply introducing the bolts into their respective bores, i.e., by attachment of the clamp. However, in order to simplify this comparatively complicated lens fitting operation in a preferred embodiment of the invention a locking or closing lever, which is preferably annular, is provided for each slot in the outer portion of the eyeglas rim, and in which each lever extends through a bore formed in the eyeglass rim on one side of the slot, with the lever being pivotably supported in the bore, and including a recess in the eyeglass rim on the other side of the slot adapted to be engaged by the lever. Consequently, this affords the opportunity of always being able to contract or close and latch the slot in its closed position by means of the lever during the fitting sequence, without necessitating attachment of the clamps. Accordingly, only when the fitting has been completed and the eyeglasses or lenses are rigidly supported within the eyeglass rims are the clamps applied. Moreover, the locking or closing levers prevent the eyeglass rims from springing open in the event of the threaded connection between the clamps and the eyeglass rim loosening or unscrewing during protracted use, and so as to protect the eyeglass or lens encompassed by the eyeglass rim from falling out of the frame.

BRIEF DESCRIPTION OF THE DRAWING

The invention is now described in greater detail in the following description of an exemplary embodiment of an eyeglass frame, in conjunction with the accompanying drawings, in which.

DETAILED DESCRIPTION

Figure 1:
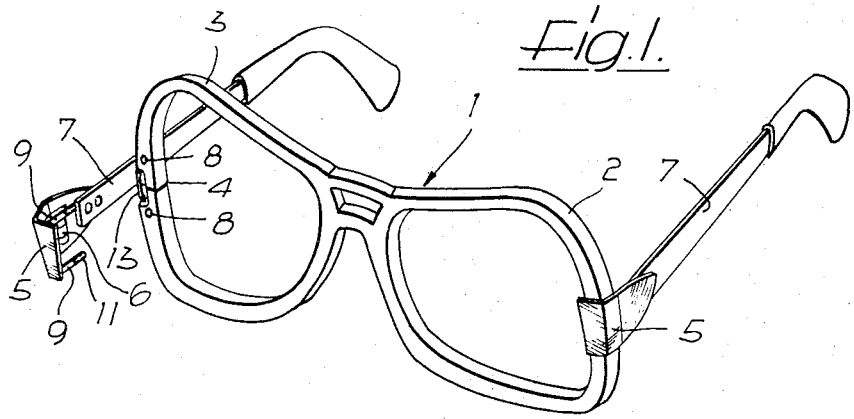
FIG. 1 is a perspective view of an exemplary embodiment of an eyeglass frame according to the invention.
Figure 2:
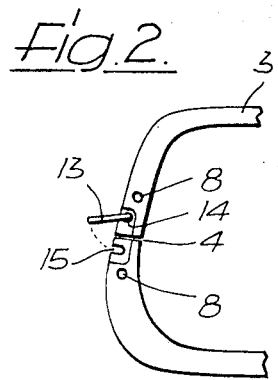
FIGS. 2 and 3 are top plan and front elevational views, respectively, of the outer portion of the right side eyeglass rim with the rim clamp omitted.
Figure 3:
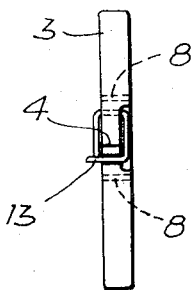
Figure 4:
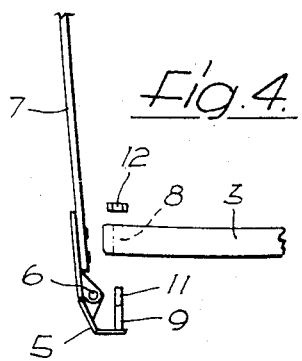
FIG. 4 is an exploded top plan view of the outer portion of the right side eyeglass rim.
Figure 5:
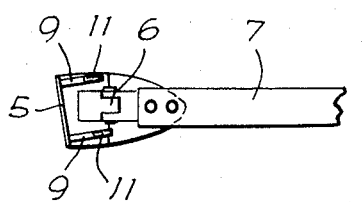
FIG. 5 is an interior view of an end part of the right side eyeglass side piece or temple with attached clamp.

The frame for eyeglasses as illustrated in the drawings includes a central portion 1 having a pair of eyeglass or lens-encompassing rims 2 and 3, which are provided with slots 4 in each of their outer portions. Clamps 5 are provided so as to cover the slots 4 while concurrently including hinges 6 for the attachment of eyeglasses side pieces or temples 7.

A through bore 8 is provided in the rims on either side of each slot 4, each bore 8 being adapted to receive a bolt 9 which is rigidly attached to or mounted on a corresponding clamp 5. Each bolt 9 may have the shape of a threaded pin, and may be provided with a threaded nut 12 for mating engagement with thread 11 formed on each bolt 9.

Furthermore, each slot 4 has provided therefore an annularly extending closing lever 13, which is mounted in the outer portion of each rim 2 and 3, each annular lever extending through a through-bore 14 formed in eyeglass rims 2 and 3 on one side of each slot 4, and being pivotally supported therein. An outwardly opening recess or groove 15 is formed in each rim on the outer side of each slot 4, and is adapted to be engaged by the annular lever in one operative position thereof, whereby each slot 4 can be latched into contracted or closed position by lever 13 without requiring a clamp 5.

During the fitting of lenses into the eyeglass rims 2 and 3, the slot 4 is compressed after the lens has been inserted into the respective rim, and latched by means of the closing lever 13. Afterwards, it can be precisely determined if the lens fits precisely in the eyeglass rim. If this is not the case, the closing lever 13 is pivoted out of engagement with recess 15 to thereby open slot 4, and the lens removed from the rim for subsequent additional grinding or cutting. When the fitting sequence for the lens is completed, the bolts or screws 9 of a clamp 5 are introduced into and through the bores 8 and fastened therein to the rim by means of threaded nuts 12, the closing lever 13 having been previously pivoted into its closed and latching position.

The bolts 9 may also have the shape of internally threaded sleeves, whereby cooperative fastening screws or bolts may be used in lieu of the threaded nuts 12. In eyeglass frames in which there is no replacement or exchange of lenses, for instance, inexpensive or non-prescription sunglasses, the bolts 9 may be in the form of rivets, which are permanently fastened to the respective rims 2 or 3.

In the illustrative example of the eyeglass frame according to the invention, the central or rim portion 1 and the main portion of the side pieces or temples 7 are made of aluminum. The clamps 5, the hinge 6, and the bolts 9 are usually formed of a more rigid, stainless or non-corroding metal, such as for instance, brass or high-quality steel. However, the invention may also be carried out with equal effect and success when the central portion 1 is made of any other metal or suitable plastic material, and particularly a plastic which cannot be expanded through heating to such an extent sufficient to allow the lenses to be inserted into the eyeglass rims.

While there has been shown what is considered to be the preferred embodiment of the invention, it will be obvious that modifications may be made which come within the scope of the disclosure of the specification.

What is claimed is:

1. In an eyeglass frame having lens-supporting rims and side pieces hingedly connected thereto, a slot extending through the outer portion of each of said rims, at least one bore extending through said rim outer portion on opposite sides of said slot, clamp means including a hinge for supporting respectively one of said side pieces, and means provided for detachably removing said side pieces from said rim, said means including connecting bolt means being mounted on said clamp means, said connecting bolt means being insertable through said bores to position said clamp means in superposed relation over said slot while concurrently imparting a contracting and closing force to said slot.

2. A frame as claimed in claim 1, said connecting bolt means comprising a threaded screw.

3. A frame as claimed in claim 1, said connecting bolt means comprising an internally threaded sleeve.

4. A frame as claimed in claim 1, comprising further bore means extending through the outer portion of each of said rims on one side of said slot, a recess being formed in the outer portion of each said rims on the other side of said slot, lever means extending through said further slot and being pivotally journalled therein, said lever means including a portion adapted to be engaged in said recess in one operative position thereof so as to impart a contracting and closing relationship to said slot.

5. A frame as claimed in claim 4, said lever means being of essentially annular ring-shaped configuration.

* * * * *